Patented Aug. 1, 1950

2,517,312

UNITED STATES PATENT OFFICE 2,517,312

POLYAZO DYESTUFFS OF THE PYRAZOLONE SERIES AND A PROCESS OF MAKING SAME

Peter Hindermann, Basel, Switzerland, assignor to J. R. Geigy A. G., Basel, Switzerland, a Swiss firm No Drawing. Application December 31, 1946, Serial No. 719,636. In Switzerland December 27, 1945

Section 1, Public Law 690, August 8, 1946
Patent expires December 27, 1965

8 Claims. (Cl. 260—159)

I have found that valuable metallisable tetrakisazo dyestuffs are obtained, if tetrazo compounds of a simple or combined polynuclear aromatic diamine which can still further be substituted are coupled with two monoazo dyestuffs either of the same or different constitution and of the general formula

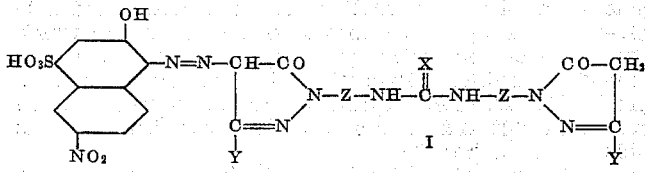

wherein
X means oxygen or a sulfur atom,
Each Y represents a methyl, ethyl or phenyl group and
Each Z stands for a member of the group consisting of radicals of the benzene series bound in 1:4-position and of radicals of the diphenyl series bound in 4:4'-position.

The coupling of the said tetrazo compounds with one mole of the above defined monoazo dyestuffs for producing the so-called intermediate product takes readily place in a slightly acid, neutral or slightly alkaline medium, whereas the subsequent coupling with a second mole of the monoazo dyestuff of the above general Formula I can also be carried out in a slightly acid, neutral or slightly alkaline medium, whereby the tetrakisazo dyestuff is produced.

The same metallisable tetrakisazo dyestuffs are also obtained by first combining the tetrazotised aromatic diamine with 1 mole of the monoazo dyestuff of the above general Formula I, thus yielding the intermediate product, then coupling the latter with a molar quantity of a dipyrazolone obtainable by condensation of 2 moles of an aminopyrazolone derivative of the general Formula

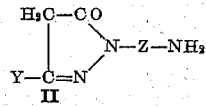

wherein Y and Z have the above meaning, with phosgene or thiophosgene or carbon disulfide respectively and finally interacting the resultant trisazo dyestuff with a molar quantity of 1-diazo-6-nitro-2-hydroxynaphthalene-4-sulfonic acid.

A further method for making the new tetrakisazo dyestuffs of my present invention consists in that aminoazo dyestuffs are treated with phosgene, for instance by causing the intermediate product resulting from a tetrazonium compound of an aromatic diamine and of a molar quantity of the monoazo dyestuff of the above general Formula I to react with a molar quantity of an aminopyrazolone of the above general Formula II in order to produce the aminotrisazo dyestuff which is then linked by means of phosgene or thiophosgene according to known methods with the aminomonoazo dyestuff made by coupling 1 mole of 1-diazo-6-nitro-2-hydroxynaphthalene-4-sulfonic acid with 1 mole of aminopyrazolone of the above general Formula II.

Simple and combined aromatic diamines suitable for the present method are for instance the 4:4'-diamino compounds of diphenyl, of diphenyl methane, of diphenyl sulfide, of diphenyl sulfoxide, of diphenyl sulfone, of diphenyl amine, of diphenyl ketone, of diphenyl urea, of stilbene, moreover the 3-amino- or 4-amino-benzoyl derivatives of 1:3- and 1:4-diaminobenzene or of the above enumerated diamino compounds or of other diamino compounds. The aromatic rings of the said diamines can carry still further substituents, such as for example alkyl, halogen, hydroxyl, alkoxy, acylamino, carboxy, sulfonic acid groups and the like.

The new dyestuffs form red-brown to dark powders. When subjected to a treatment with metal-yielding agents either in substance or on the fibre according to usual methods, the new dyestuffs can be transformed into metal complex compounds. The copper complex compounds are particularly valuable because of their excellent light-fastness. The coppering can be effected, as is known, for instance with copper sulfate in a neutral or slightly acetic acid bath or also in the presence of alkali tartrates in a slightly alkaline bath. In this way orange-red or red dyeings will be produced, which are fast to light and alkalis and which often surprisingly possess also good fastness properties in the moist state.

Because of their easy availability and due to their improved drawing power onto cellulosic fibres the tetrakisazo dyestuffs of 1-(4'-aminophenyl)-3-methyl-5-pyrazolone-urea are preferred. Those dyestuffs, whose aromatic diamine middle components still contain metallisable groups, such as hydroxy, alkoxy or carboxy groups, standing in o-position either to one or both the amino groups, that is to say compounds securing still a further metal complex formation in the dyestuff molecule are distinguished by particularly good fastness properties in the moist state, if the dyeings produced with said dyestuffs on cellulosic fibres are after-treated with copper salts.

The following examples, without being limitative, will illustrate the present invention. The parts are by weight, unless otherwise stated.

*Example 1*

22.7 parts of 1-(4'-aminobenzoylamino)-4-aminobenzene are tetrazotised in a hydrochloric acid solution with 13.8 parts of sodium nitrite and the tetrazo compound made slightly acid to Congo combined in a bicarbonatic medium with 69.9 parts of the monoazo dyestuff obtained by coupling 1-diazo-6-nitro-2-hydroxynaphthalene-4-sulfonic acid on one side with the urea of 1-(4'-aminophenyl)-3-methyl-5-pyrazolone, whereby there results the intermediate product. After completion of the coupling 72.7 parts of the monoazo dyestuff made by coupling 1-diazo-6-nitro-2-hydroxynaphthalene-4-sulfonic acid on one side with urea of 1-(4'-amino-2'-methylphenyl)-3-methyl-5-pyrazolone are added thereto. After stirring for several hours at room temperature the coupling is complete. Then the dyestuff is precipitated by addition of sodium chloride, filtered and dried. It constitutes a dark powder soluble in water with a red coloration and in concentrated sulfuric acid with an orange coloration. It dyes cellulosic fibres in brown-red shades which are changed to red by an after-treatment with copper salts, the resulting red shades being distinguished by good fastness properties to light and in the moist state.

The urea of 1-(4'-amino-2'-methylphenyl)-3-methyl-5-pyrazolone can be made by introducing phosgene into a solution of 40.6 parts of the said amino-pyrazolone in 500 parts of water in the presence of an excess of sodium carbonate at room temperature, until no more free amino groups can be traced.

The urea of 1-(4'-aminophenyl)-3-methyl-5-pyrazolone can be produced according to a quite similar method by causing 37.8 parts of 1-(4'-aminophenyl)-3-methyl-5-pyrazolone, instead of 1-(4'-amino-2'-methylphenyl)-3-methyl-5-pyrazolone, to react with phosgene.

*Example 2*

28 parts of 4:4'-dihydroxy-3:3'-diaminophenylsulfone are tetrazotised with 13.8 parts of sodium nitrite in a hydrochloric acid solution. The tetrazo compound treated with sodium carbonate, until the Congo acid reaction has disappeared, is combined in a soda-alkaline medium with 139.8 parts of the monoazo dyestuff produced from nitrated diazo compound of 1-amino-2-hydroxynaphthalene-4-sulfonic acid and urea of 1-(4'-aminophenyl)-3-methyl-5-pyrazolone. Then the mixture is stirred for several hours at room temperature. After completed coupling the dyestuff is precipitated with sodium chloride, filtered and dried. It constitutes a dark powder which dissolves in water with a brown coloration and in concentrated sulfuric acid with an orange coloration; the new dyestuff dyes cellulosic fibres in brown shades which, by an after-treatment with copper salts, are converted into orange-red shades of very good light-fastness and fastness in the moist state.

Dyestuffs having similar properties will be obtained, when using, instead of the 4:4'-dihydroxy-3:3'-diaminodiphenylsulfone, a corresponding quantity of 4:4'-dihydroxy-3:3'-diaminodiphenylketone or 4:4'-diamino-3:3'-dihydroxydiphenyl.

*Example 3*

40.4 parts of urea of 1-(4'-aminophenyl)-3-methyl-5-pyrazolone are combined in a soda-alkaline solution with the intermediate product made from the tetrazonium compound of 18.4 parts of 4:4'-diaminodiphenyl and 69.9 parts of the monoazo dyestuff obtained from 1-diazo-6-nitro-2-hydroxynaphthalene-4-sulfonic acid and the urea of 1-(4'-aminophenyl)-3-methyl-5-pyrazolone, thus yielding the one-sided coupling product. As soon as no more traces of the diazo intermediate product can be detected, the mixture is coupled with 29.5 parts of 1-diazo-6-nitro-2-hydroxynaphthalene-4-sulfonic acid in the same soda-alkaline solution as that used above. The new tetrakisazo dyestuff is precipitated with sodium chloride, isolated and dried. It forms a dark powder which is soluble in water with a red-brown coloration and in concentrated sulfuric acid with an orange coloration and which dyes cellulosic fibres from a neutral dye-bath containing Glauber's salt in brown-red shades. By an after-treatment with copper sulfate there result red shades possessing excellent fastness properties.

The same dyestuff can also be produced by combining the tetrazonium compound resulting from 18.4 parts of 4:4'-diaminodiphenyl with 139.8 parts of the monoazo dyestuff obtainable from 1-diazo-6-nitro-2-hydroxy-naphthalene-4-sulfonic acid and urea of 1-(4'-aminophenyl)-3-methyl-5-pyrazolone in a bicarbonatic medium.

*Example 4*

24.4 parts of 4:4'-diamino-3:3'-dimethoxydiphenyl are tetrazotised in a hydrochloric acid solution with 13.8 parts of sodium nitrite. The tetrazo compound treated with sodium carbonate, until the Congo acid reaction has been removed is combined in a litmus-neutral medium with 139.8 parts of the monoazo deystuff produced from 1-diazo-6-nitro-2-hydroxynaphthalene-4-sulfonic acid and from the urea of 1-(4'-aminophenyl)-3-methyl-5-pyrazolone. The mixture is stirred for some hours at room temperature, whereupon the coupling is complete. The dyestuff is then precipitated with sodium chloride, filtered and dried. It forms a dark powder which dissolves in water with a red-brown coloration and in concentrated sulfuric acid with an orange coloration. The new dyestuff dyes cellulosic fibres in brownish-red shades which, by an after-treatment with copper sulfate, are changed into red shades of good fastness properties to light and to water.

A dyestuff having a somewhat more blueish shade but otherwise the same properties as the above described one can be obtained when tetrazotizing in the manner disclosed in the above example 21.6 parts of 4:4'-diamino-3:3'-dihydroxydiphenyl, instead of 4:4'-diamino-3:3'-dimethoxydiphenyl, then coupling the resulting intermediate product with the monoazo dyestuff in a soda-alkaline medium and otherwise proceeding in exactly the same manner as described above.

Example 5

The tetrazo compound produced from 33 parts of 4:4'-diaminodiphenyl-urea-3:3'-dicarboxylic acid and made neutral to Congo by means of sodium carbonate is coupled in a soda-alkaline medium with 139.8 parts of the monoazo dyestuff obtained from 1-diazo-6-nitro-2-hydroxynaphthalene-4-sulfonic acid and the urea of 1-(4'-aminophenyl) - 3 - methyl - 5 - pyrazolone. After some hours the coupling is complete and the dyestuff isolated with sodium chloride, filtered and dried. It constitutes a dark powder which is soluble in water with a brown-red coloration and in concentrated sulfuric acid with an orange coloration. From a neutral dye-bath containing Glauber's salt cellulosic fibres will be dyed with the said new dyestuff in brown-red shades which, when after-treated with copper salts, are converted into a red of good fastness properties.

Example 6

The tetrazonium compound from 26.4 parts of benzidinemonosulfonic acid is coupled in a slightly acetic acid solution with 76.8 parts of the monoazo dyestuff obtainable from 1-diazo-6-nitro-2-hydroxynaphthalene-4-sulfonic acid and the urea of 1-(4'-amino-2'-chlorophenyl)-3-methyl-5-pyrazolone. After some hours the formation of the intermediate product is complete. Then a neutral solution of 25.1 parts of 1-(4'-aminophenyl)-3-phenyl-5-pyrazolone is allowed to flow thereinto, whereupon 10 parts of sodium bicarbonate in 200 parts of water are gradually added drops by drops. After complete coupling the new aminotrisazo dyestuff is isolated, again taken up in 1000 parts of water, made distinctly brilliant-alkaline by means of sodium carbonate and condensed with phosgene and with the aminoazo dyestuff made from 29.5 parts of 1-diazo-6-nitro-2-hydroxynaphthalene-4-sulfonic acid and 25.1 parts of 1-(4'-aminophenyl)-3-phenyl-5-pyrazolone, until no more free amino groups can be traced. The tetrakisazo dyestuff thus formed is precipitated with sodium chloride, isolated and dried. It is a dark powder which dissolves in water with a brown-red coloration and in concentrated sulfuric acid with an orange color. The new dyestuff dyes cotton and fibres from regenerated cellulose in brownish-red shades which, by an after-treatment with copper salts, are changed to red shades of good fastness properties to light and in the moist state.

The same dyestuff can also be obtained by interacting the above described intermediate product resulting from the tetrazo compound of 26.4 parts of benzidine monosulfonic acid and 76.8 parts of the monoazo dyestuff, produced from 1 - diazo - 6 - nitro - 2 - hydroxynaphthalene - 4 - sulfonic acid and from the urea of 1-(4'-amino-2'-chlorophenyl) - 3 - methyl-5-pyrazolone, with 82.3 parts of the monoazo dyestuff made from 1 - diazo - 6 - nitro - 2 - hydroxy - naphthalene-4-sulfonic acid and from the urea of 1-(4'-aminophenyl)-3-phenyl-5-pyrazolone, whereby the tetrakisazo dyestuff is obtained.

The urea of 1-(4'-amino-2'-chlorophenyl)-3-methyl-5-pyrazolone is obtained by introducing phosgene into a solution of 44.7 parts of the said aminopyrazolone in 500 parts of water in the presence of an excess of sodium carbonate at room temperature, until no more free amino groups can be traced.

When interacting 50.2 parts of 1-(4'-aminophenyl)-3-phenyl-5-pyrazolone with phosgene the corresponding urea is obtained according to the same method.

The 1-(4'-amino-2'-chlorophenyl)-3-methyl-5-pyrazolone is obtained by interacting 13 parts of aceto acetic acid ethyl ester with 18.75 parts of 4-nitro-2-chloro-phenyl-hydrazine in boiling alcohol, whereby first the 1-(4'-nitro-2'-chlorophenyl)-3-methyl-5-pyrazolone is formed which by reduction with iron is converted into the above said amino pyrazolone.

When interacting other acyl acetic esters and substituted p-nitrophenyl-hydrazines in equivalent quantities, the corresponding 1-(4'-nitrophenyl)-5-pyrazolones or 1-(4'-aminophenyl)-5-pyrazolones respectively will be obtained which, with respect to their properties, are very similar to those of the above described 1-(4'-amino-2'-chlorophenyl)-3-methyl-5-pyrazolone.

The following table sets forth additional examples of dyestuffs according to the present invention, the process of preparation being essentially analogous to the process described in the preceding examples.

Table

| No. | Monoazo dyestuff from 1-diazo-6-nitro-2-hydroxynaphthalene-4-sulfonic acid and following dipyrazolone according to formula I | Aromatic diamine | Monoazo dyestuff from 1-diazo-6-nitro-2-hydroxynaphthalene-4-sulfonic acid and following dipyrazolone according to formula I | Shade of the dyeing after coppered on cellulosic fibres |
|---|---|---|---|---|
| 1 | urea from 1-(4'-aminophenyl)-3-methyl-5-pyrazolone. | 4:4'-diaminodiphenylmethane. | urea from 1-(4'-aminophenyl)-3-methyl-5-pyrazolone. | red. |
| 2 | ---do--- | 4:4'-diaminodiphenyl-urea-3:3' disulfonic acid. | ---do--- | reddish-orange. |
| 3 | ---do--- | 4:4'-diaminodiphenyl-urea. | ---do--- | red. |
| 4 | thiourea from 1-(4'-aminophenyl)-3-methyl-5-pyrazolone. | 4:4'-diamino-diphenyl. | thiourea from 1-(4'-aminophenyl)-3-methyl-5-pyrazolone. | Do. |
| 5 | urea from 1-phenyl-(4'-phenyl-4''-amino)-3-methyl-5-pyrazolone. | 4:4'-diaminostilbene-2:2'-disulfonic acid. | urea from 1-phenyl-(4'-phenyl-4''-amino)-3-methyl-5-pyrazolone | orangish-red. |
| 6 | urea from 1-(4'-amino-2'-methoxyphenyl)-3-methyl-5-pyrazolone. | 4:4'-diaminodiphenyl-3:3'-disulfonic acid. | urea from 1-(4'-aminophenyl)-3-methyl-5-pyrazolone. | red. |
| 7 | urea from 1-(4'-aminophenyl)-3-phenyl-5-pyrazolone. | 4:4'-diaminodiphenyl-2:2'-disulfonic acid. | urea from 1-(4'-aminophenyl)-3-phenyl-5-pyrazolone. | Do. |
| 8 | urea from 1-(4'-aminophenyl)-3-methyl-5-pyrazolone. | 1-(4'-aminobenzoylamino)-4-amino-benzene-3-sulfonic acid. | urea from 1-(4'-amino-2'-bromophenyl)-3-methyl-5-pyrazolone. | Do. |
| 9 | ---do--- | 1-(3'-aminobenzoylamino)-4-amino-benzene-3-sulfonic acid. | urea from 1-(4'-aminophenyl)-3-methyl-5-pyrazolone. | Do. |
| 10 | ---do--- | 1-(4'-aminobenzoylamino)-4-amino-benzene-3-carboxylic acid. | ---do--- | Do. |
| 11 | ---do--- | 1-(3'-aminobenzoylamino)-4-amino-benzene-3-carboxylic acid. | ---do--- | Do. |
| 12 | ---do--- | 4:4'-diaminodiphenyl-3:3'-dicarboxylic acid. | ---do--- | Do. |
| 13 | thiourea from 1-(4'-aminophenyl)-3-methyl-5-pyrazolone. | 4:4'-diamino-3:3'-dihydroxydiphenyl. | thiourea from 1-(4'-aminophenyl)-3-methyl-5-pyrazolone. | blueish-red. |
| 14 | urea from 1-(4'-aminophenyl)-3-methyl-5-pyrazolone. | ---do--- | urea from 1-phenyl-(4'-phenyl-3':2''-dimethyl-4''-amino)-3-methyl-5-pyrazolone. | red. |

Table—Continued

| No. | Monoazo dyestuff from 1-diazo-6-nitro-2-hydroxynaphthalene-4-sulfonic acid and following dipyrazolone according to formula I | Aromatic diamine | Monoazo dyestuff from 1-diazo-6-nitro-2-hydroxynaphthalene-4-sulfonic acid and following dipyrazolone according to formula I | Shade of the dyeing after coppered on cellulosic fibres |
|---|---|---|---|---|
| 15 | urea from 1-(4'-aminophenyl)-3-methyl-5-pyrazolone. | 4:4'-diaminodiphenyl-sulfone | urea from 1-(4'-aminophenyl)-3-methyl-5-pyrazolone. | red. |
| 16 | ....do.... | 4:4'-diaminodiphenyl sulfoxide | ....do.... | Do. |
| 17 | ....do.... | 4:4'-diaminodiphenyl sulfide | ....do.... | Do. |
| 18 | ....do.... | 4:4'-diaminodiphenylamine | ....do.... | Do. |
| 19 | ....do.... | 4:4'-diamino-2:2':5:5'-tetramethoxy-diphenyl-urea. | ....do.... | Do. |
| 20 | ....do.... | 4:4'-diamino-2:2':5:5'-tetraethoxy-diphenyl-urea. | ....do.... | Do. |
| 21 | urea from 1-(4'-aminophenyl)-3-ethyl-5-pyrazolone. | 4:4'-diaminodiphenyl methane | urea from 1-(4'-aminophenyl)-3-ethyl-5-pyrazolone. | Do. |
| 22 | urea from 1-(4'-amino-3'-methylphenyl)-3-methyl-5-pyrazolone. | 1-(3'-aminobenzoylamino)-4-aminobenzene. | urea from 1-(4'-amino-3'-methylphenyl)-3-methyl-5-pyrazolone. | Do. |
| 23 | urea from 1-(4'-aminophenyl)-3-methyl-5-pyrazolone. | 4:4'-diamino-3:3'-dichlorodiphenyl | urea from 1-(4'-aminophenyl)-3-methyl-5-pyrazolone. | Do. |
| 24 | ....do.... | 4:4-diamino-3:3'-dimethyl-diphenyl | ....do.... | Do. |
| 25 | ....do.... | 4:4'-diaminodiphenyl-3:3'-dihydroxyacetic acid. | ....do.... | Do. |
| 26 | thiourea from 1-(4'-aminophenyl)-3-methyl-5-pyrazolone. | 4:4'-diaminodiphenylketone | thiourea from 1-(4'-aminophenyl)-3-methyl-5-pyrazolone. | Do. |
| 27 | thiourea from 1-(4'-amino-3'-methylphenyl)-3-methyl-5-pyrazolone. | 4:4'-diamino-3:3'-dichlorodiphenyl-methane. | thiourea from 1-(4'-amino-3'-methylphenyl)-3-methyl-5-pyrazolone. | Do. |
| 28 | urea from 1-(4'-aminophenyl)-3-methyl-5-pyrazolone. | 4:4'-diamino-3:3'-dimethyldiphenyl-methane. | urea from 1-(4'-aminophenyl)-3-methyl-5-pyrazolone. | Do. |
| 29 | ....do.... | 3:3'-diamino-4:4'-dihydroxydiphenyl-urea-5:5'-disulfonic acid. | ....do.... | Do. |
| 30 | ....do.... | 4:4'-diamino-3:3'-dichlorodiphenyl-sulfone. | ....do.... | Do. |
| 31 | ....do.... | 3:3'-diamino-4:4'-dimethoxy-diphenyl-sulfone. | ....do.... | Do. |
| 32 | ....do.... | 3:3'-diamino-diphenyl-methane | ....do.... | Do. |
| 33 | ....do.... | 4:4'-diamino-3:3'-dichlorodiphenyl-ketone. | ....do.... | Do. |
| 34 | urea from 1-phenyl-(4'-phenyl-4''-amino)-3-methyl-5-pyrazolone. | 3:3'-diamino-4:4'-dibromodiphenyl-ketone. | ....do.... | Do. |
| 35 | thiourea from 1-(4'-amino-2'-chlorophenyl)-3-methyl-5-pyrazolone. | 4:4'-diamino-stilbene | thiourea from 1-(4'-amino-2'-chlorophenyl)-3-methyl-5-pyrazolone. | Do. |
| 36 | urea from 1-(4'-aminophenyl)-3-ethyl-5-pyrazolone. | 4:4'-diamino-2:2'-dichloro-stilbene | urea from 1-(4'-aminophenyl)-3-ethyl-5-pyrazolone. | Do. |
| 37 | ....do.... | 4:4'-diaminodiphenylamine-2-sulfonic acid. | ....do.... | Do. |
| 38 | ....do.... | 1-(4'-methoxy-3'-aminobenzoyl-amino)-4-aminobenzene. | ....do.... | Do. |
| 39 | urea from 1-(4'-aminophenyl)-3-methyl-5-pyrazolone. | 1-(4'-amino-benzoylamino)-2:5-dimethoxy-4-aminobenzene. | urea from 1-(4'-aminophenyl)-3-methyl-5-pyrazolone. | Do. |
| 40 | urea from 1-(4'-aminophenyl)-3-methyl-5-pyrazolone. | 1-(4'-aminobenzoyl-amino)-2-methoxy-5-methyl-4-aminobenzene. | urea from 1-(4'-aminophenyl)-3-methyl-5-pyrazolone. | Do. |
| 41 | ....do.... | 4:4'-diaminostilbene-2:2'-dicarboxylic acid. | ....do.... | Do. |
| 42 | ....do.... | 2:2'-diamino-4:4'-dichlorodiphenyl-sulfide. | ....do.... | Do. |
| 43 | ....do.... | 2:2'-diamino-4:4'-dichlorodiphenl-sulfoxide. | ....do.... | Do. |

What I claim is:

1. A process for the manufacture of a polyazo dyestuff which corresponds to the formula

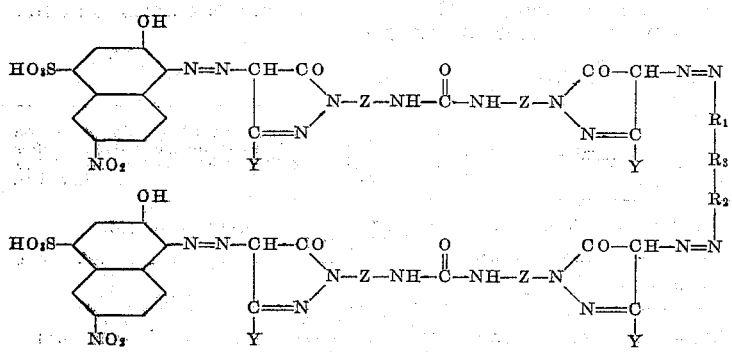

wherein in the foregoing formulae Y stands for a radical selected from the group consisting of methyl, ethyl and phenyl radicals, Z stands for a member selected from the group consisting of radicals of the benzene series bound in 1:4-position and of radicals of the diphenyl series bound in 4:4'-position, $R_1$ and $R_2$ each stand for a divalent radical of the benzene series, and $R_3$ stands for a divalent linking member selected from the group consisting of the direct linkage, —NH—CO—NH—, —NH—CO—, —CH=CH—, —NH—, —S—, —$SO_2$—, —CO— and —$CH_2$— radicals.

which comprises coupling 1 mole of 1-diazo-6-nitro-2-hydroxy-naphthalene - 4 - sulfonic acid with 1 mole of a pyrazolone-urea of the formula

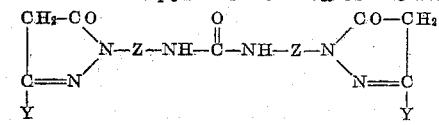

and coupling 2 moles of so obtained monoazo dyestuff with 1 mole of a tetrazotised diamine of the formula

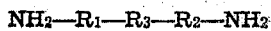

2. A process for the manufacture of a polyazo dyestuff which corresponds to the formula

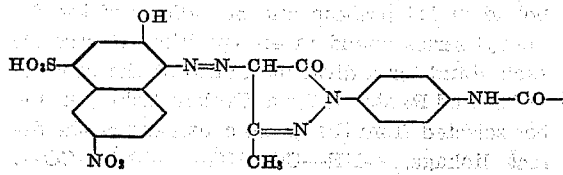

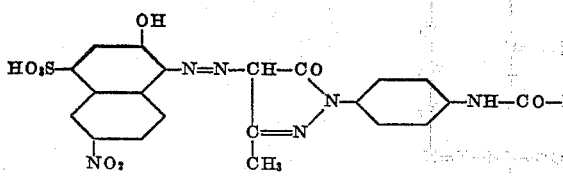

which comprises coupling 1 mole of 1-diazo-6-nitro-2-hydroxy-naphthalene-4-sulfonic acid with 1 mole of the pyrazolone-urea of the formula

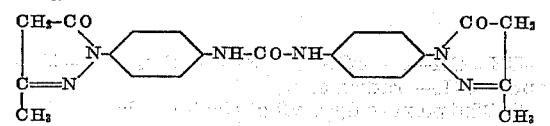

and coupling 2 moles of the so obtained monoazo dyestuff with 1 mole of the tetrazotised diamine of the formula

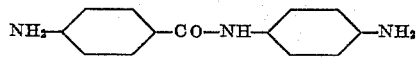

3. A process for the manufacture of a polyazo dyestuff which corresponds to the formula

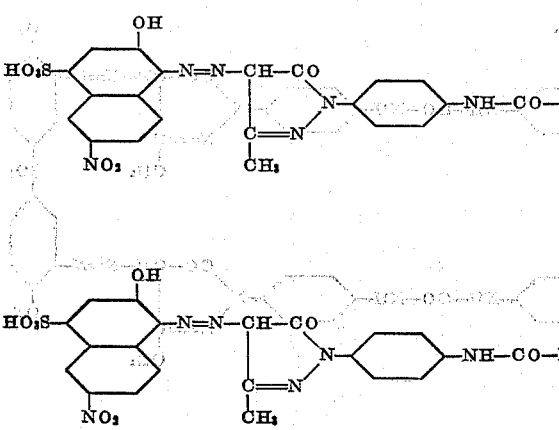

which comprises coupling 1 mole of 1-diazo-6-nitro-2-hydroxy-naphthalene - 4 - sulfonic acid with 1 mole of the pyrazolone-urea of the formula

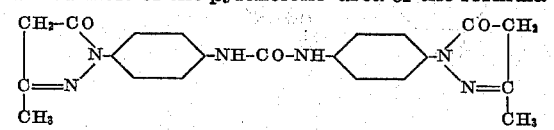

and coupling 2 moles of the so obtained monoazo dyestuff with 1 mole of tetrazotised benzidine.

4. A process for the manufacture of a polyazo dyestuff which corresponds to the formula

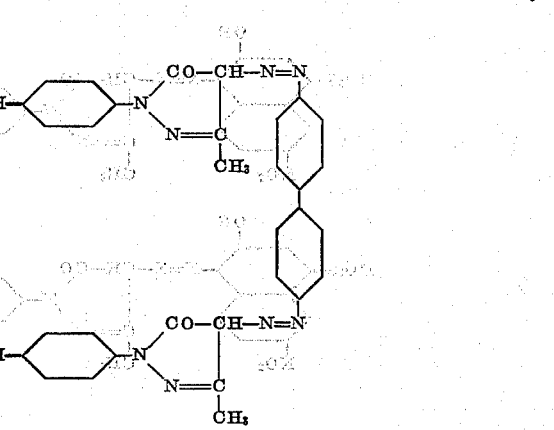

which comprises coupling 1 mole of 1-diazo-6-nitro-2-hydroxy-naphthalene - 4 - sulfonic acid with 1 mole of the pyrazolone-urea of the formula

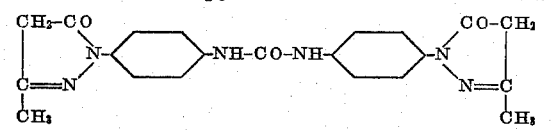

and coupling 2 moles of the so obtained monoazo dyestuff with 1 mole of the tetrazotised diamine of the formula

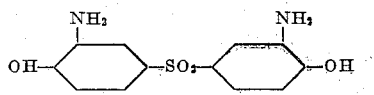

5. A polyazo dyestuff which corresponds to the formula

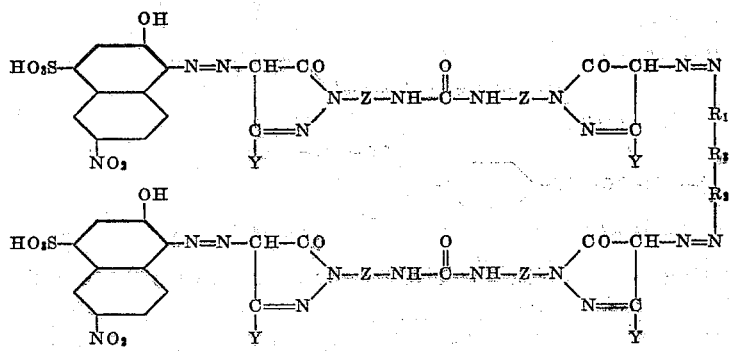

wherein Y stands for a radical selected from the group consisting of methyl, ethyl and phenyl radicals, Z stands for a member selected from the group consisting of radicals of the benzene series bound in 1:4-position and of radicals of the diphenyl series bound in 4:4'-position, $R_1$ and $R_2$ each stand for a divalent radical of the benzene series, and $R_3$ stands for a divalent linking member selected from the group consisting of the direct linkage, —NH—CO—NH—, —NH—CO—, —CH=CH—, —NH—, —S—, —SO$_2$—, —CO— and —CH$_2$— radicals.

6. The polyazo dyestuff of the formula

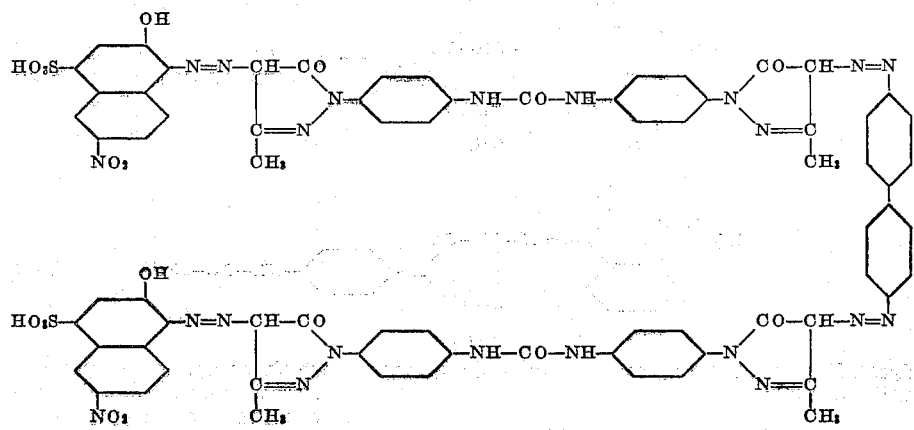

7. The polyazo dyestuff of the formula

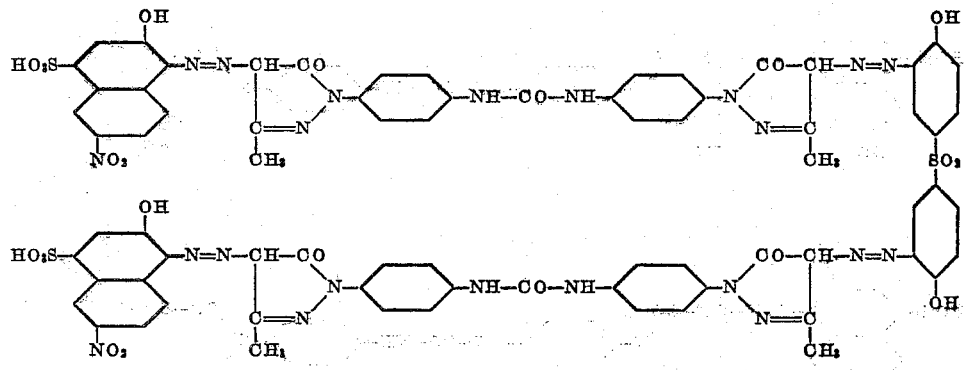

8. The polyazo dyestuff of the formula
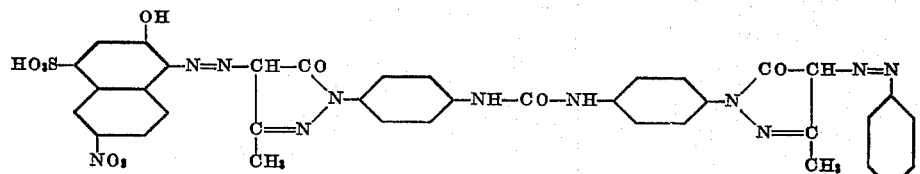
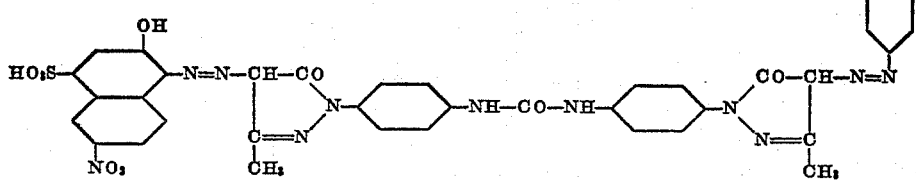
PETER HINDERMANN.
REFERENCES CITED
The following references are of record in the file of this patent:
UNITED STATES PATENTS
| Number    | Name        | Date          |
|-----------|-------------|---------------|
| 1,845,426 | Latten      | Feb. 16, 1932 |
| 2,155,001 | Schmid      | Apr. 18, 1939 |
| 2,191,800 | Murphy      | Feb. 27, 1940 |
| 2,195,784 | Schmid      | Apr. 2, 1940  |
| 2,195,787 | Schmid      | Apr. 2, 1940  |
| 2,219,712 | Schmid      | Oct. 29, 1940 |
| 2,221,360 | Schmid      | Nov. 12, 1940 |
| 2,221,361 | Schmid      | Nov. 12, 1940 |
| 2,221,362 | Schmid      | Nov. 12, 1940 |
| 2,228,374 | Stusser et al. | Jan. 14, 1941 |
| 2,405,353 | Hanhart     | Aug. 6, 1946  |
FOREIGN PATENTS
| Number  | Country     | Date         |
|---------|-------------|--------------|
| 248,806 | Switzerland | Apr. 1, 1948 |